April 8, 1969   C. E. POSTLETHWAIT   3,437,178
ROPE CLAMP
Original Filed May 31, 1966   Sheet 1 of 3
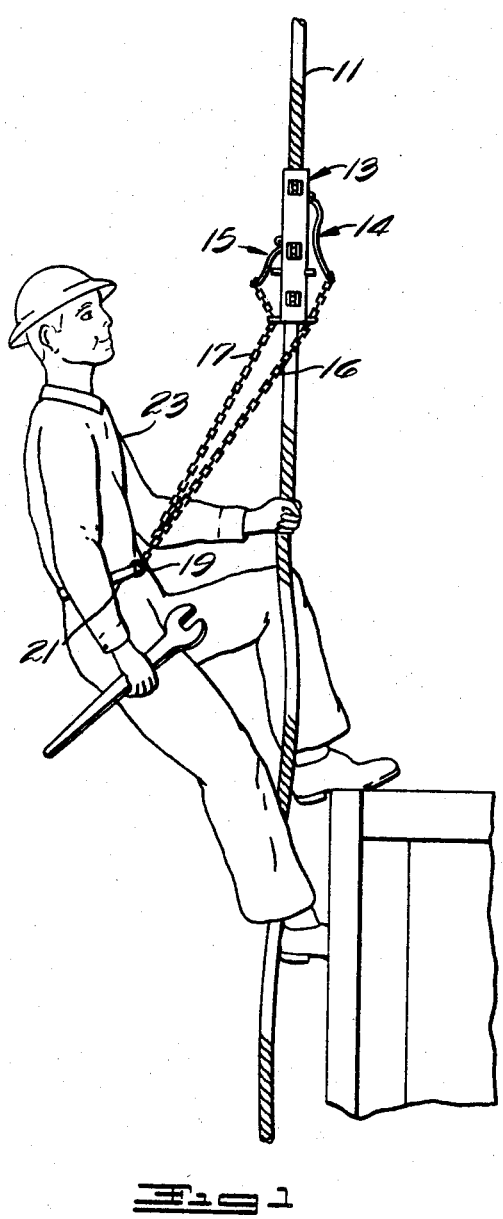
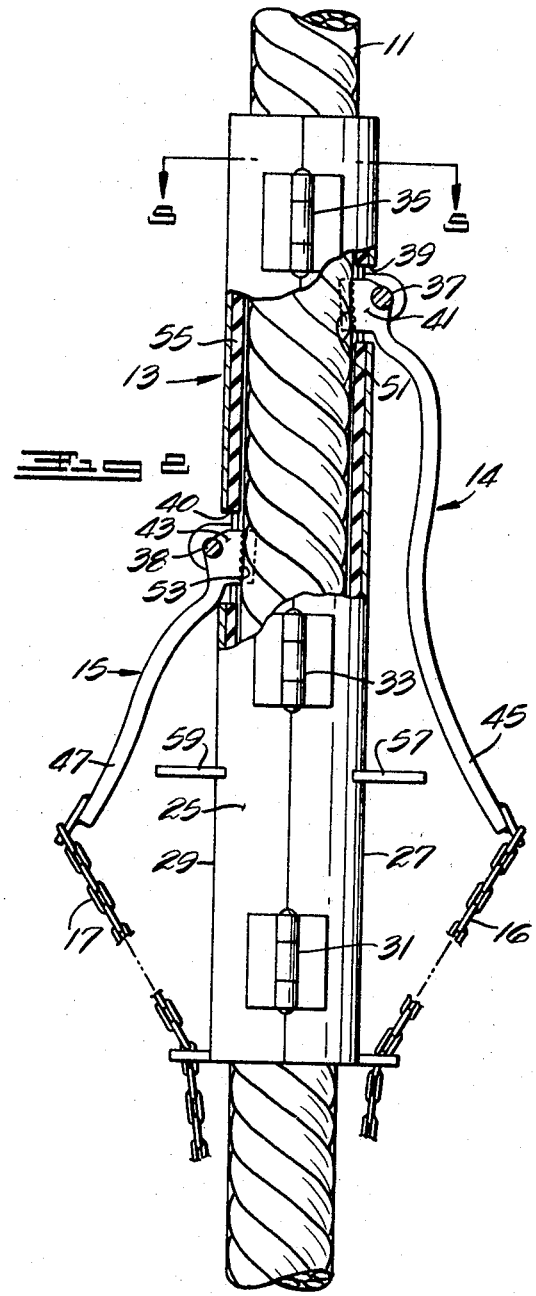
INVENTOR.
COLUMBUS E. POSTLETHWAIT
BY
Cox & Sheridan
ATTORNEYS

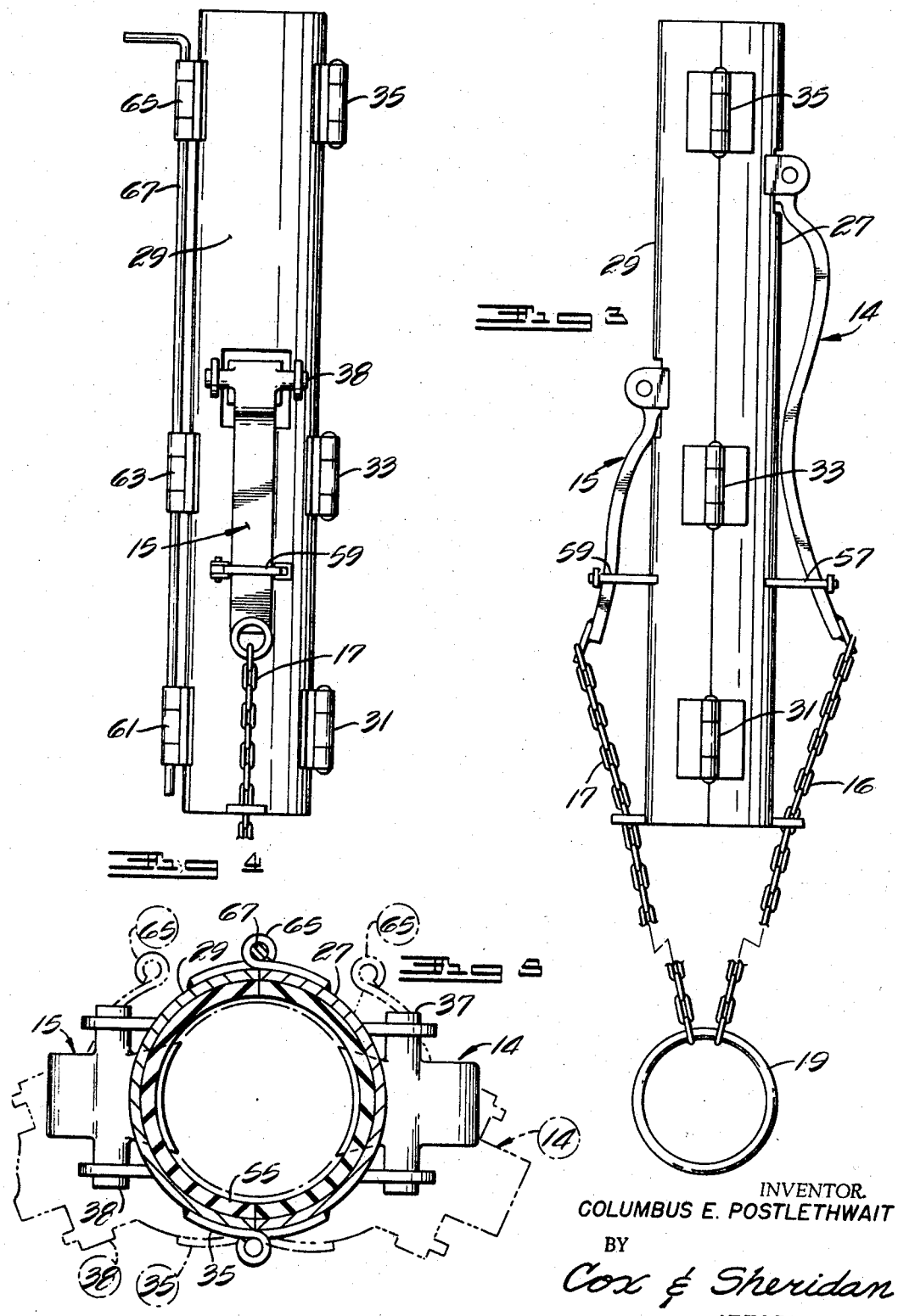

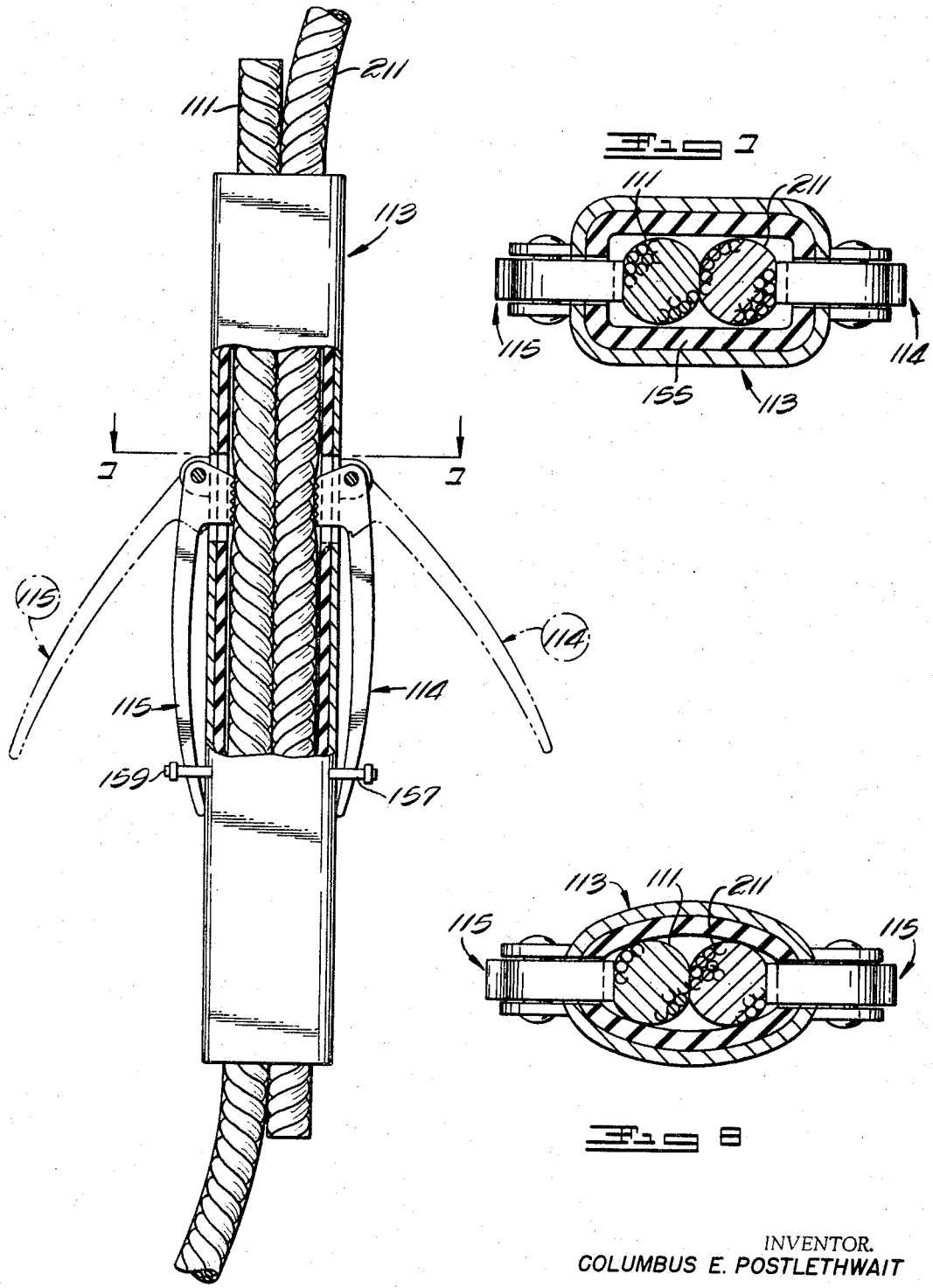

United States Patent Office 3,437,178
Patented Apr. 8, 1969

3,437,178
ROPE CLAMP
Columbus E. Postlethwait, Box 72,
Red House, W. Va. 25168
Continuation of application Ser. No. 553,993, May 31, 1966. This application Dec. 13, 1967, Ser. No. 690,359
Int. Cl. B65h 59/16; F16g 11/00; E06c 7/18
U.S. Cl. 188—65.2
6 Claims

ABSTRACT OF THE DISCLOSURE

A rope clamp is described comprising: a tube formed in two longitudinal halves which are hinged together on one side and similarly connected on the other side, and are fastenable around a rope and lined with a resilient material; and two levers extending through openings in the tube wall and pivoted to the wall, each lever having a short arm extending into the tube provided with serrations for contacting the rope within the tube and a long arm to which a safety belt is attached.

Background of the invention

This application is a continuation of my copending application, Ser. No. 553,993, filed May 31, 1966 and now abandoned.

The invention disclosed and claimed in this application relates to a rope clamp. More specifically it relates to a clamp which serves to couple two ropes together or which serves to secure a workman to a rope at heights above the ground.

A device of this type; which is used for the purpose of supporting heavy weights and specifically climbers, construction workers, building repair men, and the like; has to be completely and entirely safe. While the rope may be in excellent condition and quite capable of supporting the weight of a workman, the device which is clamped to the rope and which connects the worker to the rope must also be capable of being firmly secured to the rope without any danger of breakage, slippage, or failure. Moreover, it is convenient and often necessary for the worker or climber to be able to quickly clamp the device to the rope and quickly remove it therefrom when desired.

Objects

Accordingly, it is one object of this invention to provide a clamping device capable of being firmly secured to a rope and capable of supporting any fairly heavy object such as a person.

It is another object of this invention to provide a clamping device which, when fastened to a rope or cable, will not slip, break, or fail.

It is another object of this invention to provide a rope or cable clamping device which may be quickly fastened to or quickly removed from a rope or cable.

It is also an object of this invention to provide an effective coupling means whereby two ropes may be securely fastened together.

I have now found that the foregoing and related objects can be attained in a clamp for attachment to a rope comprising a tube adapted to encompass said rope, said tube having at least one opening in the wall thereof; at least one lever pivoted to the wall of said tube, said lever having a first arm movable inwardly through said opening toward said rope, and said lever having a second arm outside said tube; and restraining means cooperating with said second arm to restrain said second arm against pivotal movement; whereby a rope can be inserted into said tube and, upon the effecting of a pivotal movement of said second arm, said first arm is pressed against said rope and whereby maintenance of the pressure of said first arm against said rope is effected by said restraining means.

Further objects and features of this invention will become apparent from the following specification and claims when considered in connection with the accompanying drawings showing several embodiments of my invention.

Drawings

In the drawings, FIG. 1 is a perspective view of a rope to which there is secured a rope clamp forming an embodiment of my invention and which supports a workman by means of said rope clamp;

FIG. 2 is an enlarged view in elevation of a fragment of the rope and of the rope clamp shown in FIGURE 1, a portion of the clamp being broken away and shown in section;

FIG. 3 is a view in elevation similar to FIG. 2 but showing the rope clamp removed from the rope;

FIG. 4 is a view in side elevation (the clamp having been turned 90° from the position shown in FIG. 3) and like FIGURE 3 showing the rope clamp removed from the rope; and FIG. 5 is a view in horizontal section, partly in phantom, taken substantially on the line 5—5 of FIG. 2.

FIG. 6 is a view in elevation, partly in phantom, of a clamp forming an embodiment of my invention which is somewhat different from that shown in FIGS. 1–5.

FIG. 7 is a view in horizontal section taken substantially on the line 7—7 of FIG. 6.

FIG. 8 is a view in horizontal section of an alternative embodiment of the invention and having a different cross sectional appearance.

Referring now to the drawings for a more detailed description of the device, it may be seen that I have shown in FIGURE 1, a rope 11 to which there is secured a clamp, indicated generally by 13. The clamp 13 is provided with levers, indicated generally by 14 and 15. The levers will be described in more detail hereinafter. Chains 16 and 17 are secured to the ends of the levers 14 and 15. The chains 16 and 17 are connected to a ring 19 secured to a belt 21, the belt 21 being shown (in FIG. 1) secured around the waist of a man 23.

The term "rope," as used herein, is intended to cover an ordinary rope of woven fibers, a steel cable, a wire, or like object.

The clamp 13 comprises a tube 25 which is formed in two half sections designated respectively as 27 and 29. The two sections; as shown in FIG. 3, for example; are secured together by hinges 31, 33, and 35. The levers 14 and 15 are pivoted on the tube 25 as at 37 and 38 respectively. The levers 14 and 15; as shown in FIG. 2, for example; are formed respectively with first arms 41 and 43 and with second arms 45 and 47, the first arms being relatively shorter than the second arms in order to secure a mechanical advantage upon pressing inwardly on the second arms. The first arms 41 and 43 are formed with serrations such as 51 and 53 which are designed to dig into and clamp the rope 11 which is enclosed in the cylinder 25. The tube 25 can have any suitable cross section; circular as shown in FIG. 5, rectangular as shown in FIG. 7, elliptical as shown in FIG. 8, and the like.

Adjacent the pivots 37 and 38 the wall of the tube 25 is formed with two oppositely disposed openings 39 and 40 through which the shorter arms 41 and 43 of the levers 14 and 15 are movable inwardly in order to press against and clamp the rope 11.

As shown in FIG. 4, at the side of the tube 25 opposite to the hinges 31, 33, and 35, the tube is formed with similar hinge elements 61, 63, and 65 through which a pin or wire 67 is positioned in order to hold the tube in its closed position and to clamp the rope.

The weight of an object (or man 23) attached to the chains 16 and 17 effects an inward pivotal movement to the lever arms 45 and 47, thus drawing the arms 45 and 47 of the levers 14 and 15 downward so that the serrations 51 and 53 of the shorter arms 41 and 43 are pressed into more intimate contact with the rope 11. The tube 25 may be lined with a flexible liner 55 (as shown in FIG. 5, for example) so that the rope may be held more securely. As stated above, the weight on chains 16 and 17 draws the longer arms 45 and 47 downward and the rope is thus securely and effectively clamped within the cylinder. But in addition as an added safety factor, there are provided additional restraining means such as locking members 57 and 59 for securing these longer arms in a locked position. The chains 16 and 17 serve as restraining means to restrain the lever arms 45 and 47 against outward pivotal movement.

In FIG. 6 I have shown an alternative embodiment of my invention which is particularly useful for the coupling of two ropes (111 and 211). The embodiment shown may include hinges (such as hinges 31, 33, 35, 61, 63, 65 shown in FIG. 4) but such hinges are not always necessary when the two ropes to be coupled have free ends which can be inserted into or "threaded," through the tube, indicated generally by 113. The arms, indicated generally by 114 and 115 are shown in phantom in their "uncoupled" position and are also shown in their locked position adjacent the wall of the tube 113, the lock members being 157 and 159. Although the arms 114 and 115 are shown in FIG. 6 as moving downwardly as they move inwardly it will be apparent that the position of one (or both) such arms can be reversed such that the arm (or arms) moves upwardly during the clamping movement. In FIG. 7 (the rope being partially clamped) I have shown the tube 113 as having a rectangular cross section and having a resilient liner material 155. In FIG. 8 (the rope being partially clamped) I show a particularly effective cross section; that is, elliptical. The latter permits an extremely tight squeeze to be put on the ropes 111 and 211 between the levers and the liner 155 of the clamp.

*Operation*

In order to secure the clamp illustrated in FIGS. 1–5 about a rope or cable 11 the operator removes the pin 67, opens the tube 25 on the hinges 31, 33, and 35 (as in phantom in FIG. 5), inserts the rope within the open clamp, then closes the clamp, and then reinserts the pin 67. Thereafter, he moves the levers 14 and 15 to their lower position thus clamping the rope between the two levers 14 and 15 and particularly between the two serrations 51 and 53 of the short arms 41 and 43, respectively. The operator then takes the free ends of the chains 16 and 17 and secures them to an object, as for example, to the ring 19 of a belt 21 which is about the operator's waist. He then clamps the long arms 45 and 47 by means of the safety clamps 57 and 59. For safety in climbing, it is possible for the climber to use two such rope clamps, especially if there are two cables. This allows an operator to go up or down the cables with the protection of a rope clamp by simply alternating the position of the two clamps upward or downward as he goes, one such clamp holding him safely as he secures the second one in a desired higher or lower position.

In order to secure together two ropes having free ends a clamp such as is shown in FIG. 6 may be used. The operator threads the two ropes 111 and 211 through the tube with the lever arms in an outward position. He then moves the arms inwardly and clamps them adjacent the tube wall with the lock members 157 and 159. If the two ropes (such as 111 and 211) do not have free ends the operator can use a clamp like that shown in FIG. 6 except provided with hinges as shown in the embodiment of FIGS. 1–5. Where the clamp is used as a coupling chains such as chains 16 and 17 (see FIG. 1) are not required.

It is to be understood that the above described embodiment of my invention is for the purpose of illustration only and various changes may be made therein without departing from the spirit and scope of the invention.

I claim:

1. For an improved clamp for attachment to a rope of the type comprising a tube adapted to encompass the rope, the tube having a wall with at least one opening therein; at least one lever pivoted to the wall of the tube, the lever having a first arm movable inwardly through the opening toward the rope, and the lever having a second arm outside the tube; and restraining means co-operating with the second arm to restrain the second arm against undesired pivotal movement; whereby a rope can be inserted into said tube and, upon the effecting of an inward pivotal movement of said second arm, said first arm is pressed against said rope and whereby maintenance of the pressure of said first arm against said rope is effected by said restraining means, the improvement which comprises a resilient liner lining the inside of said tube, at least two openings in the wall of said tube positioned on diametrically opposite sides thereof, at least two levers, one for each opening; and at least two restraining means; one restraining means being secured to the second arm of each lever, said levers being constructed and arranged so that a weight attached to the restraining means of diametrically opposite levers maintains said tube in a vertical orientation.

2. A clamp according to claim 1 wherein at least two of the openings in the tube wall are longitudinally spaced apart.

3. The clamp according to claim 1 wherein the first arms are each provided with inwardly directed serrations, said serrations providing a more secure grip on a rope in pressed contact therewith.

4. The clamp according to claim 1 wherein said restraining means comprises chains, one for each of said second arms, each chain being adapted to be secured to a weight, whereby when said weights are secured to said chains, tension is placed on said chains, which tension acts to prevent outward pivotal movement of the second arms.

5. The clamp according to claim 1 wherein said tube has a circular cross section.

6. The clamp according to claim 1 wherein said tube has an elliptical cross section.

References Cited

UNITED STATES PATENTS

| | | |
|---|---|---|
| 462,081 | 10/1891 | Henning. |
| 1,272,991 | 7/1918 | Paglieri. |
| 2,584,282 | 2/1952 | Nelson. |

FOREIGN PATENTS

| | | |
|---|---|---|
| 19,838 | 4/1905 | Austria. |

GEORGE E. A. HALVOSA, *Primary Examiner.*

U.S. Cl. X.R.

24—134; 182—5; 188—65.3